United States Patent
Seller et al.

(10) Patent No.: US 11,962,342 B2
(45) Date of Patent: Apr. 16, 2024

(54) WIRELESS COMMUNICATION NETWORK AND TRANSCEIVER

(71) Applicant: Semtech Corporation, Camarillo, CA (US)

(72) Inventors: Olivier Bernard André Seller, Sainte-Soulle (FR); Baozhou Ning, Grenoble (FR); Martin Wuthrich, Brügg (CH)

(73) Assignee: Semtech Corporation, Camarillo, CA (US)

( * ) Notice: Subject to any disclaimer, the term of this patent is extended or adjusted under 35 U.S.C. 154(b) by 0 days.

(21) Appl. No.: 17/846,283

(22) Filed: Jun. 22, 2022

(65) Prior Publication Data

US 2023/0024735 A1     Jan. 26, 2023

Related U.S. Application Data

(60) Provisional application No. 63/218,064, filed on Jul. 2, 2021.

(51) Int. Cl.
*H04B 1/7143* (2011.01)
*H04B 1/7136* (2011.01)

(52) U.S. Cl.
CPC ......... *H04B 1/7143* (2013.01); *H04B 1/7136* (2013.01)

(58) Field of Classification Search
CPC .. H04B 1/7143; H04B 1/7136; H04B 1/7156; H04B 2201/713; Y02D 30/70
See application file for complete search history.

(56) References Cited

U.S. PATENT DOCUMENTS

| 10,341,919 B2 | 7/2019 | Koifman |
| 10,667,214 B2 | 5/2020 | Wentzloff et al. |
| 11,368,184 B2 | 6/2022 | Seller et al. |
| 2013/0191427 A1* | 7/2013 | Farrugia ................. G06F 7/582 |
| | | 708/250 |
| 2020/0007186 A1* | 1/2020 | Seller ................... H04B 1/7156 |

FOREIGN PATENT DOCUMENTS

| EP | 3591853 A1 | 1/2020 |
| KR | 10-20130122758 A | 11/2013 |
| KR | 10-20150144318 A | 12/2015 |
| KR | 10-20200003730 A | 1/2020 |
| WO | WO-2011/025206 A2 | 3/2011 |
| WO | WO-2012/070048 A1 | 5/2012 |
| WO | WO-2013-008849 A1 | 1/2013 |
| WO | WO-2014/153061 A3 | 3/2014 |

OTHER PUBLICATIONS

RU Inquiry and Translation for Application No. 2022113191/07, dated Jan. 18, 2023, 9 pgs.
English Translation of Notice of Preliminary Rejection for KR-1020220080113, dated May 9, 2023, 4 pgs.

* cited by examiner

*Primary Examiner* — Sam K Ahn
*Assistant Examiner* — Amneet Singh
(74) *Attorney, Agent, or Firm* — Blank Rome LLP

(57) ABSTRACT

A radio transmitting device configured to transmit a spread-spectrum radio signal wherein a carrier frequency changes in a predetermined set of radio channels according to a hopping sequence, the radio signal being organized in packets having each a header transmitted at a first channel in the hopping sequence comprising a detection sequence, and payload data encoding a message transmitted at following channels in the hopping sequence.

12 Claims, 2 Drawing Sheets

WIRELESS COMMUNICATION NETWORK AND TRANSCEIVER

REFERENCE DATA

Figure 1:
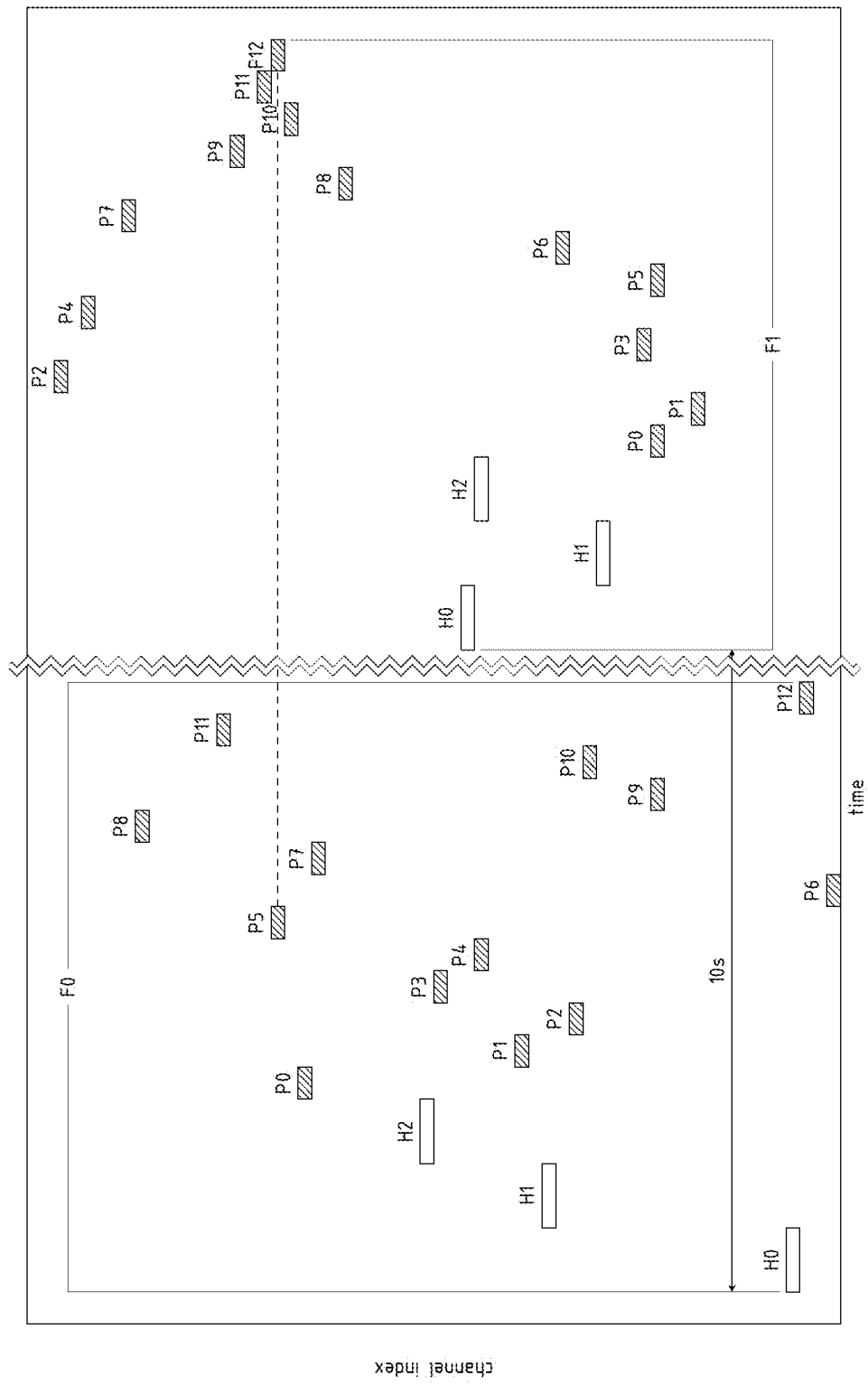

The present application claims benefit of the prior date of U.S. provisional application 63/218,064 of Jul. 2, 2021, the contents whereof are entirely incorporated.

TECHNICAL DOMAIN

The present invention concerns a wireless transmitter and a wireless data network comprising a plurality of transmitters. in specific, but not exclusive, uses, the present invention relates to low-power measuring nodes for IoT (internet-of-Things) applications and a IoT wide area network that includes a plurality of measuring nodes together with gateways and other devices. The invention makes use of frequency hopping to spread the spectrum of a narrowband radio signal.

RELATED ART

Several competing low-power radio networks are used to provide connectivity in IoT applications. Local Area networks, like Wi-Fi and Bluetooth have been successfully used in some applications, but they require a local infrastructure connected to the internet, which is not always available or desirable and are hardly applicable to mobile applications in which the sensor nodes may move outside the accessible range of a Wi-Fi or Bluetooth gateway. Low-power wide-area networks (LPWAN) have also been proposed for IoT applications. These networks very often operate in unlicensed radio band and must have high resistance to interferences while maintaining compliance with regulations.

Frequency hopping spread-spectrum (FHSS) is a radio transmission method used to increase the bandwidth of a signal. In this method, the transmitter changes the transmission carrier frequency according to a pseudo-random series, the "hopping sequence". The message can be decoded and understood by knowing the hopping sequence and using a receiver synchronized with the frequency hops of the transmitter. FHSS transmissions are highly resistant to interference and are used advantageously in unlicensed bands for this reason.

Low-power wide-area networks are using frequency hopping to increase the system capacity at low data rate.

Transmission by radio means is subject to very complex regulations that vary in different countries and regions. It is often a requirement of these regulations that the transmission energy should be spread equally among the available channels and that the occupation of each individual channel do not exceed a given limit. The FCC rules, for example stipulate that no channel should be occupied for more than 0.4 s in a generic time window of 20 s. and that the system shall use at least 50 hopping channels spaced by at least 25 kHz.

Pseudorandom sequences are central to many frequency hopping systems and can be generated in a variety of ways. It is desirable that the succession of channels be governed by a sequence that has a long period and assumes all the possible values in its domain once, i.e., a permutation. linear-feedback shift registers (LFSR) are often used to generate such sequences. They generate series of values that are completely determined by an initial state and are necessarily periodic since the domain of generable data is finite. An accurate choice of the retroaction function produces maximally long sequences. Such retroaction functions can be expressed as modulo-2 polynomials and their coefficients are representable by a number having as many bits as the number of cells of the shift register.

Most often, the transmitters of low-rate networks do not have precise real-time clocks. They spend most of the time in a low-power state in which time is kept only approximately, or not at all. When they must transmit data (upload a measurement to a gateway, for example), synchronization exchanges are preferably avoided, because they use network capacity and consume power. Ideally IoT transmitter should be able to wake up from a low-power state, gather a measurement and transmitting it without overheads. The receiver cannot rely on the fact that all the transmission channels happen in predetermined slots, or on collaboration between the transmitters.

Messages exchanged in low-rate networks do not follow a predictable schedule and often include special detection sequences or sync-words that are used at the receiver's side to determine that a message is arriving. Reliable detection imposes a minimal length to the detection sequences.

SHORT DESCRIPTION OF THE DRAWING

The invention will be disclosed referring to the drawing that illustrate:

FIG. 1: two packets transmitted by a first variant of the inventive transmitter.

Figure 2:
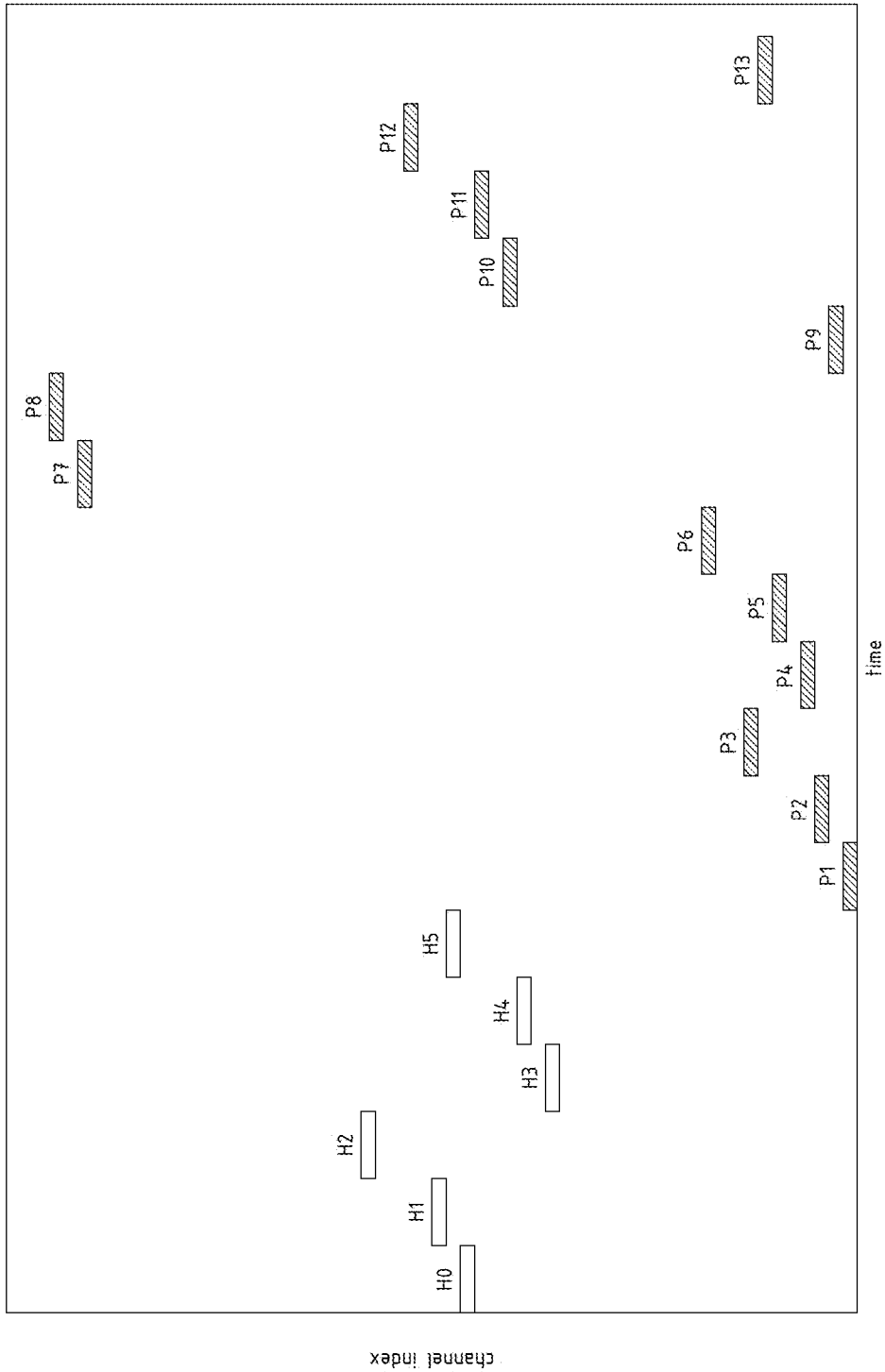

FIG. 2: one packet transmitted by a second variant of the inventive transmitter.

SHORT DISCLOSURE OF THE INVENTION

The invention proposes a radio transmitter that uses Frequency hopping spread-spectrum modulation to transmit data to a corresponding receiver. The data is organized in packets associated each to a special hopping sequence. Each packet contains a series of fragments separated by frequency hops. Each fragment is transmitted in a channel determined by the hopping sequence. Packets have one or more header fragments comprising a detection sequence and announcing the hopping sequence in a suitably encoded form, and payload fragments conveying the desired message, following the header. Preferably, each packet has a plurality of redundant headers transmitted one after the other at different channels, according to the hopping sequence.

The invention proposes a transmitter configured to generate for each packet a suitable hopping sequence by applying a binary XOR mask to a permutation that is known to the receiver. In this manner, the selected hopping sequence can be announced in a simple and compact form.

When several transmitters are in a network, each is configured to generate a different hopping sequence at random and use it with little or no overhead. The hopping sequences should have good cross-correlation properties to limit collisions between different sequences. Correlation is defined as the total of identical frequencies when comparing two frequencies and their relative time or frequency shifts.

In a preferred variant, the permutation is the output of a maximal-length linear feedback shift register whose feedback function is a polynomial from a restricted set of maximal-length polynomials that are conventionally known to all the receivers in a network. The length of the shift register corresponds to the length of the binary mask. The initial state of the shift register may also be defined by a convention. The feedback function can be announced in the header as well. Since the number of possible choices is reduced, an index pointing to the chosen polynomial in an array known to both transmitter and receiver is all that is needed.

The sequence of channels may be obtained by applying repeatedly the XOR mask to the state of the shift register and then decrementing the result by one. Since the linear feedback shift register can never produce the null state, the XOR operation will be omitted when the status of the linear register is the same as the binary mask, otherwise the value of the binary mask could never be generated. This sequence produces a pseudorandom succession of numbers with ideal cross-correlation in the range [0, L−2], where L is the period of the LFSR. Because the feedback function is chosen to yield a maximal length period, it holds $L=2^n$. where n is the length of the shift register.

Another possible implementation consists in inserting a 0 at a determined place in the output of the shift register and then applying the XOR mask.

The method used in the transmitter disclosed herein generates as many unique hopping sequences that as the product of the number of possible masks times the subset of feedback function selected. For practical and regulatory reasons, the number of available channels may be less than the range of the hopping sequence generated with the inventive method. In this case, the range of the permutation can be reduced to the set of available channels either skipping non-available channels or replacing them with silences. The latter option is preferable because it preserves the desirable cross-correlation properties of the LFSR.

The first fragments of a packet include a detection sequence or sync-word, and a header announcing information needed to track and decode the payload, for example the hopping sequence, the payload length, the modulation coding, and so on. Given the important and special nature of the information contained in the header or headers, it is desirable that the headers are not interrupted by frequency hops. Accordingly, the hops may need to be lengthened in the header, and the transmitter may dwell in a channel for a longer time during the transmission of the header. This requires some attention with respect to the regulations.

Band occupation rules may impose a maximum occupation time for each channel. FCC, for example, stipulates that no frequency shall be used for more than 400 ms in any 20 s period. If the length of a header hop is already more than half this figure, this rule may be violated by an immediately successive packet choosing a sequence where the same channel repeats in one of the first positions used by headers, unless the transmitter delays the successive packet by at least 20 s.

The transmitter of the invention is configured to choose the hopping sequence of a packet such that the channel of the first hops in a hopping sequence are different from those of same position in an immediately preceding packet. Accordingly, the transmitter of the invention can transmit a second packet without waiting 20 s. The way the sequences are generates ensures that this condition is respected simply by choosing a binary mask with a predetermined offset from that of the immediately preceding packet.

Examples of Embodiments of the Present Invention

The invention hangs on the definition of hopping sequences that have good property for spectrum use and capacity in a low-rate low-power wide-area network. The transmitters of the invention generate radio messages that are organized in packets associated each to a special hopping sequence. Each packet contains a series of fragments separated by frequency hops; the carrier frequency being changed according to the hopping sequence. The transmitting devices of the invention may not be synchronized in time and use random hopping sequences to limit collisions.

Packets start with at least one header fragment that contains a detection sequence and header information needed to track and decode the payload data. Header information may vary but in typical implementations they contain the payload length and format and the modulation scheme. Preferably, the header announces the hopping sequence that will be followed in the series of fragments that will come after.

Given the important nature of the information encoded in the header, the header is preferably repeated in redundant fashion. For example, each packet may start with two, three or four header fragments. Each header fragment contains enough information to allow a receiver to synchronize with the hopping sequence and decode the content of the payload fragments.

Header fragments have a minimum size dictated by the size of the sync word and the amount of information that they must convey. This may require a duration longer than that of the payload fragments. In a practical implementation, the "normal" fragments containing a payload have a length of 102.4 ms, while the header payloads, for the reason above, have a length of 233.47 ms. This is more than half the maximum dwell time allowed in the FCC regulation and requires special considerations, which will be disclosed later.

According to an aspect of the invention, the technique used to generate hopping sequences relies on a linear feedback shift register of N bits for a base sequence and uses of bitwise XOR operator to derive more sequences. The transmitter chooses for the feedback function a polynomial of maximal length for N. The number of bits of the shift register and the polynomial are selected according to the number of channels that must appear in the hopping sequence by a suitable prescription, for example per the following table.

TABLE 1

| N. of channels | 10 | 22 28 30 35 47 | 60 62 | 86 99 | 185 198 | 390 403 |
|---|---|---|---|---|---|---|
| Polynomials (dec.) | 33 51 | 45 48 54 57 | 33 45 48 51 54 57 | 65 68 71 72 | 142 149 | 264 |
| N (bits) | 6 | 6 | 7 | 8 | 9 | |
| initial state (dec.) | 6 | 64 | 6 | 6 | 6 | |

The table is compiled for certain sizes of the channel grid only: 10, 22, 28, 30, 35, 47, 60, 62, 86, 99, 185, 198, 390 and 403. These are cases of interest or values that are prescribed by regulations for specific regions. The invention could include other values, however. The polynomials and the initial state are given in the decimal representation.

The length N of the shift register is 6, 7 or 8 bits, according to the size of the channel grid. It will be appreciated that the feedback polynomials are in general be more than one. Depending on the size of the channel grid, one or several polynomials are used (up to 6). The transmitter of the invention is configured to choose one polynomial at random among the available possibilities. Importantly and preferably, however, the polynomials are chosen to give maximal-period sequences.

In a sequence, the status of the shift register will assume a series of values that are a permutation of [1, 2N−1] (the status consisting of N zeros is missing due to linearity). The initial state of the LFSR is also prescribed and is either 6 or 64, according to number of channels. The choices of the polynomials and of the initial state are conventional and may be replaced by other. Note that the initial state given is before the bit-shift initial step of updating the shift register. Thus, the initial status 64 of the second column is valid, even if its binary representation is a 7-bit number.

Thus, the LFSR of the transmitter can generate as many permutations of [1, 2N−1] as are the possible choices of polynomials for a given grid of channels.

To increase the number of generable hopping sequences, the transmitter has a step of combining the LFSR base sequence with a predetermined binary mask of N bits in a bitwise XOR operation. The binary mask will be denoted by xor_seed. It can assume all the values [0, 2N−1] and is combined at each step with the N-bit status of the shift register. Since the shift register never generates the value 0, the results would never contain the value xor_seed, which is undesirable. Accordingly, the algorithm skips the XOR operation when the LFSR status is equal to xor_seed, and then decrements the result by one to produce a permutation of $[0, 2^N-2]$. In terms of code, this part of the algorithm may be coded as:

```
update_lsfr_state;
if (lfsr_state==xor_seed)
   tentative_hop = xor_seed;
else
   tentative_hop = lfsr_state^xor_seed;
tentative_hop -= 1;
``` where the update of the shift register (procedure update_lsfr_state) is not detailed and can be achieved in any suitable known manner, for example using the classical Galois implementation.

These sequences are particularly easy to generate and store. They use, on average, all the available channels, irrespective of whether the sequences are truncated—as it is often the case—and have equal or better cross-correlation properties than random generated sequences, i.e. fewer repeated collisions between 2 frames on average.

In this manner, the transmitter can generate $m \times 2^N$ permutations to be used as hopping sequences, where m is the number of possible polynomials for the chosen grid size. To fix the ideas with some numbers, for a grid of 60 channels, the table prescribes N=6 and m=6. In this manner, the transmitter can choose in a pool of 384=6×26 sequences and announce them in the header or headers. The polynomials and the initial state can be chosen such that all the hopping sequences are unique.

This manner of combining the LFSR state with an XOR binary mask to multiply the number of permutations, while preferred, is not the only one and is not essential. In a possible variant, the same result may be obtained by appending a zero value at a predetermined position in the sequence followed by a XOR of a status of the LFSR with the binary mask.

Optionally, the transmitter can introduce an additional bit operation on the result, for example a bit shuffle operation.

Keeping with numerical values given above as example, the generated pseudorandom sequences will have a range [0, 62]. This can be reduced to the desired number of channels, for example 60, by skipping non-existent channels or, preferably, replacing non-existent channel codes with silence intervals. The latter option is preferred because, as it can be demonstrated, it preserves the cross-correlation properties of the original sequence generated by the LFSR, which is favourable and reduces the number of random collisions.

To provide a numeric example, we will assume that there are 60 available channels. The hopping sequence can be built by generating a base pseudorandom random sequence of length using the prescriptions of table 1 and then altering it by XOR operations with a mask. Choosing the polynomial "51" between those available and binary mask 0b011000 (24 decimal) the hopping sequence would be:

TABLE 2

3, 21, 30, 39, 23, 19, 29, 26, 41, 0, 38, 51, 13, 18, 45,
2, 37, 6, 35, 5, 22, 43, 1, 20, 44, 48, 55, 7, 15, 27,
25, 24, 42, 49, 12, 32, 54, 59, 9, 16, 46, 47, 11, 17, 28
40, 50, 10, 33, 4, 36, 52, 56, 58, 57, 8, 34, 53, 14, 31

The same process, changing only the binary mask to 0b011100 (28) yields:

TABLE 3

27, 17, 26, 49, 10, 57, 14, 55, 13, 20, 52, 36, 44, 40, 42,
41, 6, 59, 11, 19, 23, 29, 28, 48, 38, 43, 3, 15, 25, 30,
47, 9, 22, 51, 7, 21, 24, 50, 37, 0, 31, 1, 18, 53, 8,
58, 33, 2, 12, 56, 34, 45, 4, 32, 46, 39, 5, 16, 54, 35

As already mentioned briefly, header fragments are longer than payload ones and may exceed one half of the maximum dwell time allowed by FCC rules in any 20 s period. This may lead to a rule violation because, if two packets are transmitted one after the other with different hopping sequences selected with the method disclosed above, the probability that two header fragments are emitted in the same channel is nonzero. This can be avoided with the simple but inefficient device of spacing packets by 20 s or more.

The invention proposes a preferable solution that is to choose the hopping sequence of a packet in a manner that no channels in an initial subset of contiguous channels of the sequence appears in the same subset of channels of an immediately preceding hopping sequence. In this way, the transmitter can emit two packets separated by only 10 s with the certainty that no two header fragments will happen to be in the same radio channel.

The generation method of the invention provides a particularly simple manner to choose a non-repeating hopping sequence simply by selecting a binary mask xor_seed that is shifted from the previous binary mask by a determined amount. It can be proved that if the values of xor_seed differ by ±4, ±8, ±120, ±136 or ±184, there will be no repetitions in the first three element of the hopping sequence. If they differ by ±8, ±120, ±136 or ±184 there will be no repetitions in the first four elements of the hopping sequence. This very simple rule ensures that the requirements of FCC part 15 regulation are fulfilled while transmitting one packet every 10 seconds.

FIG. 1 illustrates this arrangement. A transmitter sends a first message using the hopping sequence of table 2. This is appropriate for a FCC-regulated region and has 60 channels on a regular grid. The header fragments H0, H1, H2 are longer than the payload fragments P0-P12. After a delay of 10 seconds, the same transmitter sends a second message using the sequence of table 3. In this case, since the bit masks differ by 4, and the polynomial is the same, the header packets H0-H2 are inherently generated ad different channels than those of the previous packet. There is no such guarantee for payload packets but, since these are shorter, the rule on maximum dwell time is respected.

A limitation of the above arrangement is that, since the receiver cannot synchronise with the hopping sequence without the important information (sync word, announcement of the hopping sequence) comprised in the header, this information is necessarily transmitted in a single fragment without hops, whose length cannot be reduced at will. A solution to this additional problem would be to fashion the hopping sequence as two nested sequences.

The inner sequence is a short sequence determined by a simple invariable rule, and its hops are relative to the starting channel (in other words, they are incremental hops) such that the receiver can follow it without knowing the full hopping sequence. The outer sequence will have a range that is a fractional subset of the available channels, and the inner sequence is chosen to use all the available channels when nested with the outer one.

A manner to generate nested hopping sequences that uses all the available channels will now be disclosed, but this is only an example among many that are included in the invention. First, the length "k" of the inner sequence is chosen. This must be a divisor of the number of available channels and determines the maximum number of fragments that can be received without synchronising with the full hopping sequence.

The inner sequence is an invariable sequence of numbers $\{b_0, \ldots, b_{k-1}\}$ that have the property that their remainders of the division by k are all different or, equivalently, that $\{b_0 \bmod k, \ldots, b_{k-1} \bmod k\}$ is a permutation of $\{0, \ldots k-1\}$. It is always possible to choose $b_0=0$ without loss of generality.

The outer sequence, denoted by $\{a_0, \ldots, a_{N/k-1}\}$, will have length N/k, where N is the number of available channels and k the length of the inner sequence. It and can be built as disclosed above, by first generating a base permutation of length N/k and then altering it by XOR-ing the base permutation with a bit mask. In this variant, the range of the outer sequence is only a fractional subset of the available channels.

The full sequence is then constructed by multiplying the values of the outer sequence by k and adding in succession the increments of the inner sequence, thus:

$$h_i = (k \cdot a_{i \backslash k} b_{i \bmod k}) \bmod N$$

where the operator "\" stands for integer division. It can be proved that the full sequence is a permutation of $\{0, \ldots N-1\}$.

To fix the ideas, we will assume again that there are 60 available channels and that the needed length of the inner sequence is k=3. The inner sequence is selected, for example, as $\{0, 2, 7\}$. The outer sequence can be built by generating a base random sequence of length 20 and then altering it by XOR operations with a mask. As example, the outer sequence can be:

TABLE 4

9, 7, 0, 1, 18, 8, 2, 12, 4, 5, 16, 17, 10, 14, 13, 6, 11, 19, 3, 15 obtained by a LFSR of 6 bits, polynomial 51 (0b110011), initial state 6 and XOR mask 24 (0b011000). This, nested with the inner sequence $\{0, 2, 7\}$ yields:

TABLE 5

27, 29, 34, 21, 23, 28, 0, 2, 7, 3, 5, 10, 54, 56, 1,
24, 26, 31, 6, 8, 13, 36, 38, 43, 12, 14, 19, 15, 17, 22,

TABLE 5-continued 48, 50, 55, 51, 53, 58, 30, 32, 37, 42, 44, 49, 39, 41, 46,
18, 20, 25, 33, 35, 40, 57, 59, 4, 9, 11, 16, 45, 47, 52

Importantly, these sequences are not completely random because when the elements are grouped by k=3, each group has the form $\{y, y+2, y+7\}$ Nevertheless, they use all the available channels equally and their correlation properties are adequate. If a group of three channels is a header, and a receiver detects the first fragment—by a sync word embedded therein, for example—the channels of the two successive fragments can be determined from the first one without the knowledge of the full hopping sequence. The sync word may also be split over 2 or 3 fragments, in such case the receiver can combine them before detection, thanks to the deterministic hopping between fragments. Thus, the transmitter can send a long header without increasing the length of the fragments and without exceeding the regulatory dwell time per channel.

FIG. 2 illustrates this variant. Each group of three fragments follows the same pattern, as determined by the inner sequence. The groups are randomly distributed according to the outer sequence. The packet has two headers: a first one composed by fragments H0 H1 H2, another made by H3 H4 H5. The second header may be a redundant repetition of the first one, for robustness, or convey different information, according to the needs.

This description has disclosed specific embodiments of the invention. However, a variety of modifications and variations may be made without departing from the spirit and scope of the invention as defined by the claims. Accordingly, the specification and drawings are to be regarded as illustrative rather than restrictive.

The invention claimed is:

1. A radio transmitting device configured to transmit a spread-spectrum radio signal wherein a carrier frequency changes in a predetermined set of radio channels according to a hopping sequence, the spread-spectrum radio signal being organized in packets having each a header transmitted at a first channel in the hopping sequence comprising a detection sequence, and payload data encoding a message transmitted at following channels in the hopping sequence further configured to select a binary mask and generate the hopping sequence by generating a pseudorandom permutation of numbers, alter the pseudorandom permutation by bitwise exclusive-or operations with the binary mask, reduce a range of the altered permutation such that the range is contained in the predetermined set of radio channels, encoding the binary mask in the header to announce the hopping sequence.

2. The radio transmitting device of claim 1, wherein the packets have redundant headers announcing the hopping sequence transmitted at different channels.

3. The radio transmitting device of claim 1, configured to shuffle the bits of the hopping sequence.

4. The radio transmitting device of claim 1, configured to generate the pseudorandom permutation of numbers with a maximal-length linear feedback shift register (LFSR), wherein a feedback function of the LFSR is encoded in the header.

5. The radio transmitting device of claim 1, wherein the reduction of the range to the predetermined set of radio channels consists in skipping values that are not in the set of channels or in inserting silences when values are not in the set of channels.

6. The radio transmitting device of claim 1, wherein the alteration of the pseudorandom permutation is an exclusive-or of a status of the LFSR with the binary mask, provided the status of the LFSR is not equal to the binary mask, followed by a decrement by one.

7. The radio transmitting device of claim 1, wherein the alteration of the pseudorandom permutation is appending a zero value at a predetermined position in the sequence followed by an exclusive-or of a status of the LFSR with the binary mask.

8. The radio transmitting device of claim 1, wherein the binary mask is chosen in such a way that no channel in first subset of contiguous channels at the beginning of the hopping sequence appears in the same subset of channels of a hopping sequence of an immediately preceding packet.

9. The radio transmitting device of claim 8, wherein the header or the redundant headers have a dwell time at the respective channels that is longer than a dwell time of payload data.

10. The radio transmitting device of claim 8, wherein the binary mask has a predetermined offset from a binary mask chosen for the immediately preceding packet.

11. The radio transmitter of claim 1, wherein the hopping sequence includes two nested sequences, being an outer sequence and an inner sequence, the outer sequence being the sequence generated by altering the pseudorandom permutation by bitwise exclusive-or operations with the binary mask and reducing a range of the altered permutation in the predetermined set of radio channels, the inner sequence being a sequence of constant predetermined increments.

12. The radio transmitting device of claim 11, wherein the outer sequence has a range that is a proper subset of the predetermined set of radio channels, and the inner sequence is chosen such that the hopping sequence uses all the radio channels.

* * * * *